(12) United States Patent
Suzuki et al.

(10) Patent No.: US 10,976,208 B2
(45) Date of Patent: Apr. 13, 2021

(54) FORCE SENSOR

(71) Applicant: NIDEC COPAL ELECTRONICS CORPORATION, Tokyo (JP)

(72) Inventors: Takashi Suzuki, Sano (JP); Takao Ikeda, Sano (JP)

(73) Assignee: NIDEC COPAL ELECTRONICS CORPORATION, Tokyo (JP)

( * ) Notice: Subject to any disclaimer, the term of this patent is extended or adjusted under 35 U.S.C. 154(b) by 135 days.

(21) Appl. No.: 16/294,010

(22) Filed: Mar. 6, 2019

(65) Prior Publication Data

US 2019/0204170 A1 Jul. 4, 2019

Related U.S. Application Data

(63) Continuation of application No. PCT/JP2017/024020, filed on Jun. 29, 2017.

(30) Foreign Application Priority Data

Sep. 21, 2016 (JP) .............................. JP2016-184669

(51) Int. Cl.
*G01L 1/22* (2006.01)
*G01L 1/26* (2006.01)
(Continued)

(52) U.S. Cl.
CPC .................. *G01L 1/26* (2013.01); *G01D 11/30* (2013.01); *G01L 1/06* (2013.01); *G01L 1/22* (2013.01);
(Continued)

(58) Field of Classification Search
CPC ........... G01L 1/26; G01L 1/2206; G01L 1/22; G01L 1/06; G01L 5/0019; G01L 5/16; G01L 25/00; G01L 3/00; G01D 11/30
See application file for complete search history.

(56) References Cited

U.S. PATENT DOCUMENTS

2009/0259412 A1* 10/2009 Brogardh ............... B25J 9/1633
702/41

FOREIGN PATENT DOCUMENTS

CN 104204752 12/2014
CN 204064539 12/2014
(Continued)

OTHER PUBLICATIONS

English translation for FOR patent-1 (Year: 2010).*
(Continued)

*Primary Examiner* — Peter J Macchiarolo
*Assistant Examiner* — Fatemeh Esfandiari Nia
(74) *Attorney, Agent, or Firm* — Burris Law, PLLC (57) ABSTRACT

In a force sensor, a cylindrical movable body can be moved with respect to a cylindrical main body. A strain body is fixed to the main body and the movable body, and can be deformed in accordance with the movement of the movable body. Strain sensors are provided on the strain body. At least three circular openings are provided in the circumferential surface of the movable body at equal intervals. Stoppers are respectively arranged inside the openings, and each of which includes a first side surface having a first outer diameter smaller than an inner diameter of the opening, and a second side surface having a second outer diameter smaller than the first outer diameter. Fixing members fix the stoppers to the main body.

6 Claims, 10 Drawing Sheets

(51) Int. Cl.
*G01L 5/16* (2020.01)
*G01L 3/00* (2006.01)
*G01L 1/06* (2006.01)
*G01L 5/00* (2006.01)
*G01D 11/30* (2006.01)
*G01L 25/00* (2006.01)

(52) U.S. Cl.
CPC .............. *G01L 1/2206* (2013.01); *G01L 3/00* (2013.01); *G01L 5/0019* (2013.01); *G01L 5/16* (2013.01); *G01L 25/00* (2013.01)

(56) References Cited

FOREIGN PATENT DOCUMENTS

| | | | | |
|---|---|---|---|---|
| CN | 204301899 | 4/2015 | | |
| CN | 105092134 | 11/2015 | | |
| CN | 105651446 | 6/2016 | | |
| JP | S6468630 | 3/1989 | | |
| JP | 06043936 B | * 6/1994 | ............... | G01L 5/16 |
| JP | H0643930 | 6/1994 | | |
| JP | H0643937 | 6/1994 | | |
| JP | 2010008343 | * 6/2008 | ............... | G01L 5/16 |
| JP | 20100083434 | * 6/2008 | ............... | G01L 5/16 |
| JP | 2010008343 | 1/2010 | | |
| JP | 3168179 | 6/2011 | | |
| JP | 5248221 | 7/2013 | | |

OTHER PUBLICATIONS

English translation for FOR patent-2 (Year: 1987).*
International Search Report for international application PCT/JP2017/024020, dated Sep. 26, 2017.
Office Action issued in corresponding CN Application No. 201780054397.4 dated Apr. 23, 2020.
Office Action issued in corresponding KR Application No. 10-2019-7006095, dated Apr. 16, 2020.

* cited by examiner

FORCE SENSOR

CROSS-REFERENCE TO RELATED APPLICATIONS

This application is a continuation of International Application No. PCT/JP2017/024020, filed on Jun. 29, 2017, which claims priority to and the benefit of JP 2016-184669 filed on Sep. 21, 2016. The disclosures of the above applications are incorporated herein by reference.

FIELD

The present disclosure relates to a six-axis force sensor to be used for, for example, a robot arm or the like.

BACKGROUND

The statements in this section merely provide background information related to the present disclosure and may not constitute prior art.

A force sensor is used for, for example, a robot arm or the like and detects external force and torque in the X, Y, and Z directions (see, for example, Patent Literatures 1 (JP 2010-8343 A) and 2 (JP H06-43937 B)).

In the force sensor, external force to be applied to a force-receiving body serving as a movable part is transmitted to, for example, a diaphragm part serving as a strain body, and deformation of the diaphragm part is converted into an electrical signal to thereby be detected.

Here, if excessive external force is applied to the diaphragm part, deformation of the diaphragm part exceeds the limit and, even after the external force is removed, there is a fear that the shape of the diaphragm part cannot be restored to the original shape or damage is caused to the diaphragm part.

Thus, in order to protect the diaphragm part from such excessive external force, a protection mechanism such as a stopper or the like configured to limit the displacement of the force-receiving body is provided.

SUMMARY

The amount of displacement of the force-receiving body is extremely small, and hence when a high-sensitivity six-axis force sensor is aimed to realize, it is necessary to manage the distance (amount of displacement regarding which the protection mechanism starts to function) between the force-receiving body and stopper with an extremely high degree of accuracy in all the six-axis directions.

The present invention has been contrived in consideration of these circumstances, and embodiments described herein aim to provide a force sensor capable of managing the distance between a force-receiving body and stopper with a high degree of accuracy.

A force sensor according to the embodiment comprises: a cylindrical main body; a cylindrical movable body capable of moving with respect to the main body; a strain body fixed to the main body and the movable body, and capable of deformation in accordance with the movement of the movable body; strain sensors provided on the strain body; at least three circular openings provided in the circumferential surface of the movable body at equal intervals; stoppers which are respectively arranged inside the openings, and each of which includes a first side surface having a first outer diameter smaller than an inner diameter of the opening and a second side surface having a second outer diameter smaller than the first outer diameter; and fixing members configured to fix the stoppers to the main body.

The present invention can provide a force sensor capable of managing the distance between a force-receiving body and stopper with a high degree of accuracy.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

Further areas of applicability will become apparent from the description provided herein. It should be understood that the description and specific examples are intended for purposes of illustration only and are not intended to limit the scope of the present disclosure.

DRAWINGS

The accompanying drawings, which are incorporated in and constitute a part of the specification, illustrate embodiments of the invention, and together with the general description given above and the detailed description of the embodiments given below, serve to explain the principles of the invention.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Embodiments of the present invention will be described below with reference to the accompanying drawings. It should be noted that in the following descriptions, essentially identical functions and elements are denoted by identical reference numbers, and descriptions are given as the need arises. Further, the drawings are schematic views, and a relationship between the thickness and planar dimension, ratios of layers and the like may differ from reality in some cases.

First Embodiment

[Configuration]

Overall Configuration

Figure 1:
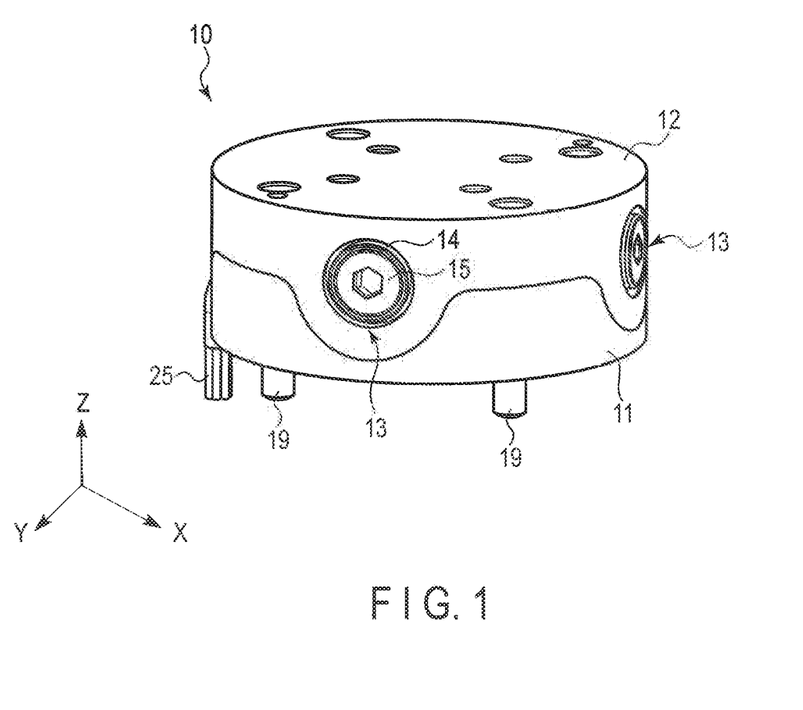
FIG. 1 is a perspective view showing a force sensor according to a first embodiment.
Figure 2:
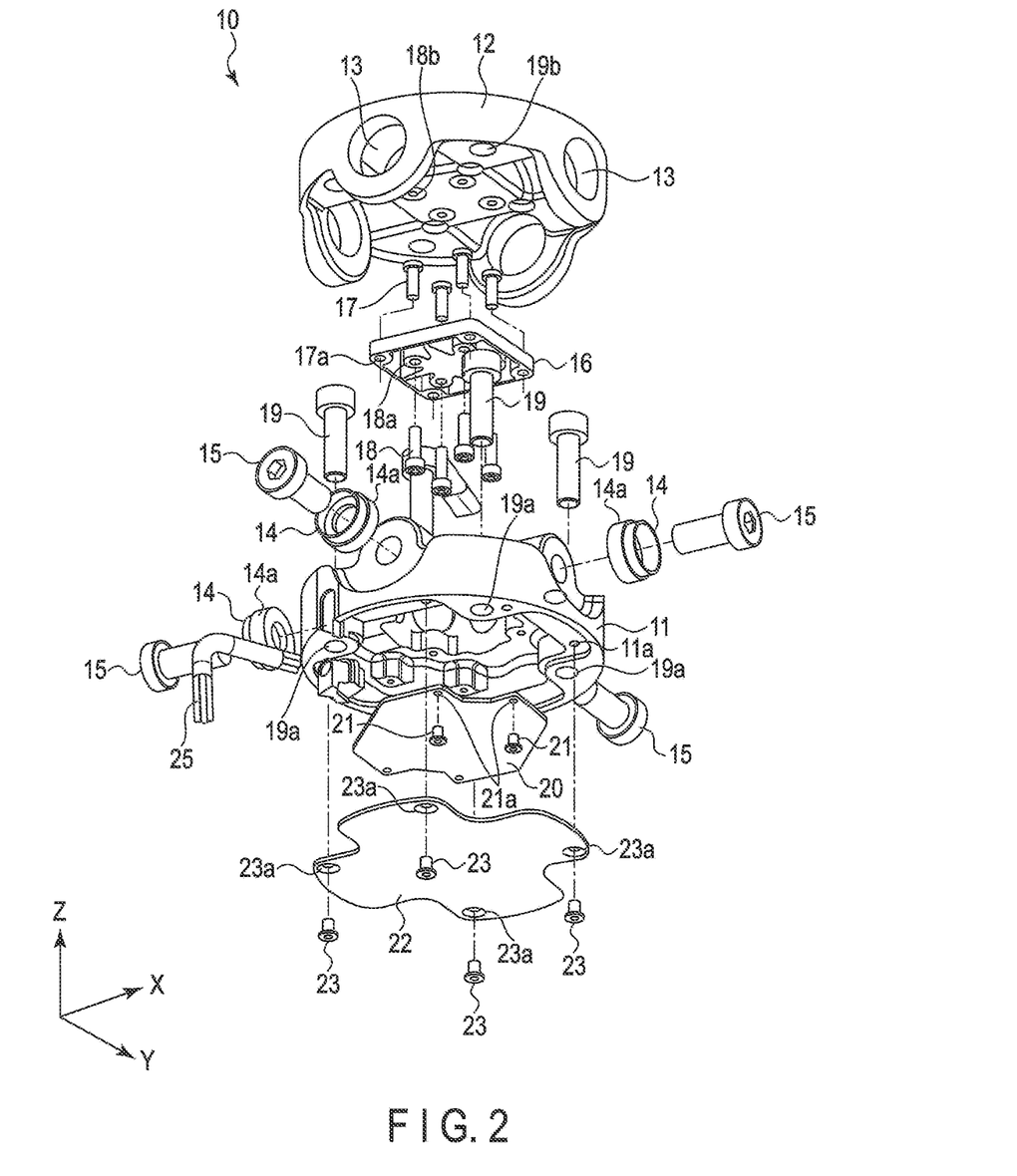
FIG. 2 is an exploded perspective view showing the force sensor according to the first embodiment.

The overall configuration of a force sensor according to a first embodiment will be described below by using FIG. 1 and FIG. 2. FIG. 1 is a perspective view showing a force sensor according to a first embodiment. FIG. 2 is an exploded perspective view showing the force sensor according to the first embodiment. The force sensor 10 according to the first embodiment is used for, for example, a robot arm or the like, and will be described below by taking a six-axis force sensor configured to detect force and torque in the X, Y, and Z directions as an example.

The force sensor 10 comprises a cylindrical main body 11 and cylindrical movable body 12 capable of moving with respect to the main body 11. The main body 11 is fixed to a main body of a robot arm not shown by means of a plurality of attaching screws 19 penetrating a plurality of screw holes 19a formed in the bottom part of the main body 11. The movable body 12 functions as a hand-attaching plate to be used to attach a hand part of the robot arm not shown to a top surface thereof.

The main body 11 is a base member serving as a base of the force sensor 10, and movable body 12 is attached to the main body 11 in such a manner as to be able to move in the six-axis directions (X-axis direction, Y-axis direction, Z-axis direction, and directions around these axes) with respect to the main body 11 with a strain body 16 capable of elastic deformation interposed between itself and the main body 11. That is, as shown in FIG. 2, the strain body 16 is fixed to the main body 11 by means of strain body fixing screws 17 each penetrating a plurality of screw holes 17a formed in the strain body 16, and is also fixed to the movable body 12 by means of hand-plate fixing screws 18 each penetrating a plurality screw holes 18a.

The surfaces of the strain body 16 are arranged in parallel with a plane formed by the X-axis and Y-axis, and a straight line passing through the center of the strain body 16 is made coincident with the Z-axis. Upon application of external force to the movable body 12, the movable body 12 is moved and the strain body 16 is displaced. The strain body 16 is provided with strain sensors to be described later, and the displacement of the strain body 16 is detected by the strain sensors.

In the circumferential surface of the movable body 12, for example, four circular openings 13 are provided at equal intervals. That is, the openings 13 are arranged in the X-axis direction and Y-axis direction. The number of the openings 13 is not limited to four, and it is sufficient if the number is three or more. Inside each of the openings 13, a stopper 14 is arranged, and each stopper 14 is fixed to the main body 11 by means of a stopper attaching bolt 15.

The stopper 14 is configured to limit the moving range of the movable body 12, and the outermost circumferential part of the stopper 14 includes a first side surface 14a with which the inner surface of the opening 13 can come into contact. That is, when the strain body 16 is deformed concomitantly with the movement of the movable body 12, the inner surface of the opening 13 of the movable body 12 comes into contact with the first side surface 14a, whereby the stopper 14 functions as a protection mechanism configured to prevent excessive deformation of the strain body 16 from occurring.

Inside the main body 11, a circuit board 20 is provided in opposition to the strain body 16. The circuit board 20 includes a plurality of screw holes 21a, and is fixed to the main body 11 by means of fixing screws 21 penetrating the screw holes 21a. To the circuit board 20, the strain sensors provided on the strain body 16 are electrically connected.

To the bottom part of the main body 11, a cover 22 configured to close the opening 11a is attached. That is, the cover includes a plurality of screw holes 23a, and is fixed to the main body 11 by means of fixing screws 23 penetrating these screw holes 23a.

To the side of the main body 11, wiring 25 configured to transmit a detection signal to the outside is drawn out. The wiring 25 is electrically connected to the circuit board 20.

Planar Configuration and Cross-Sectional Configuration

Figure 3:
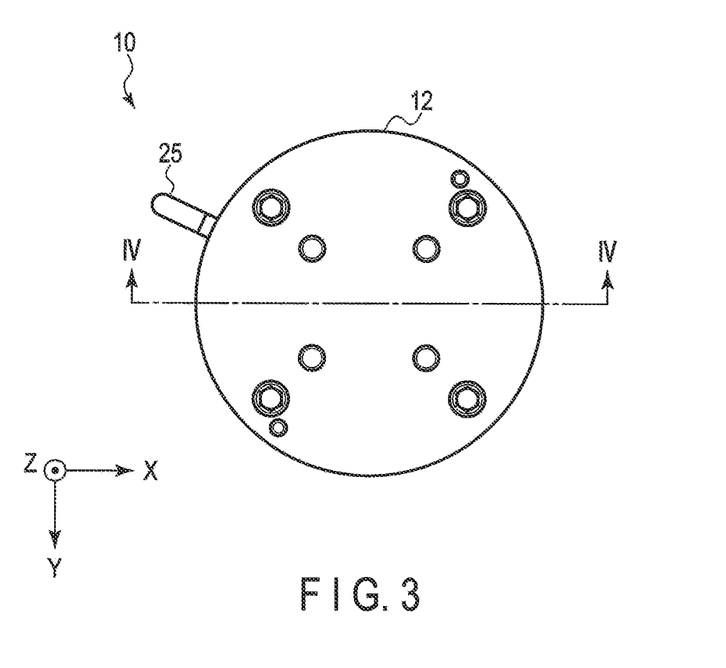
FIG. 3 is a plan view showing the force sensor according to the first embodiment.
Figure 4:
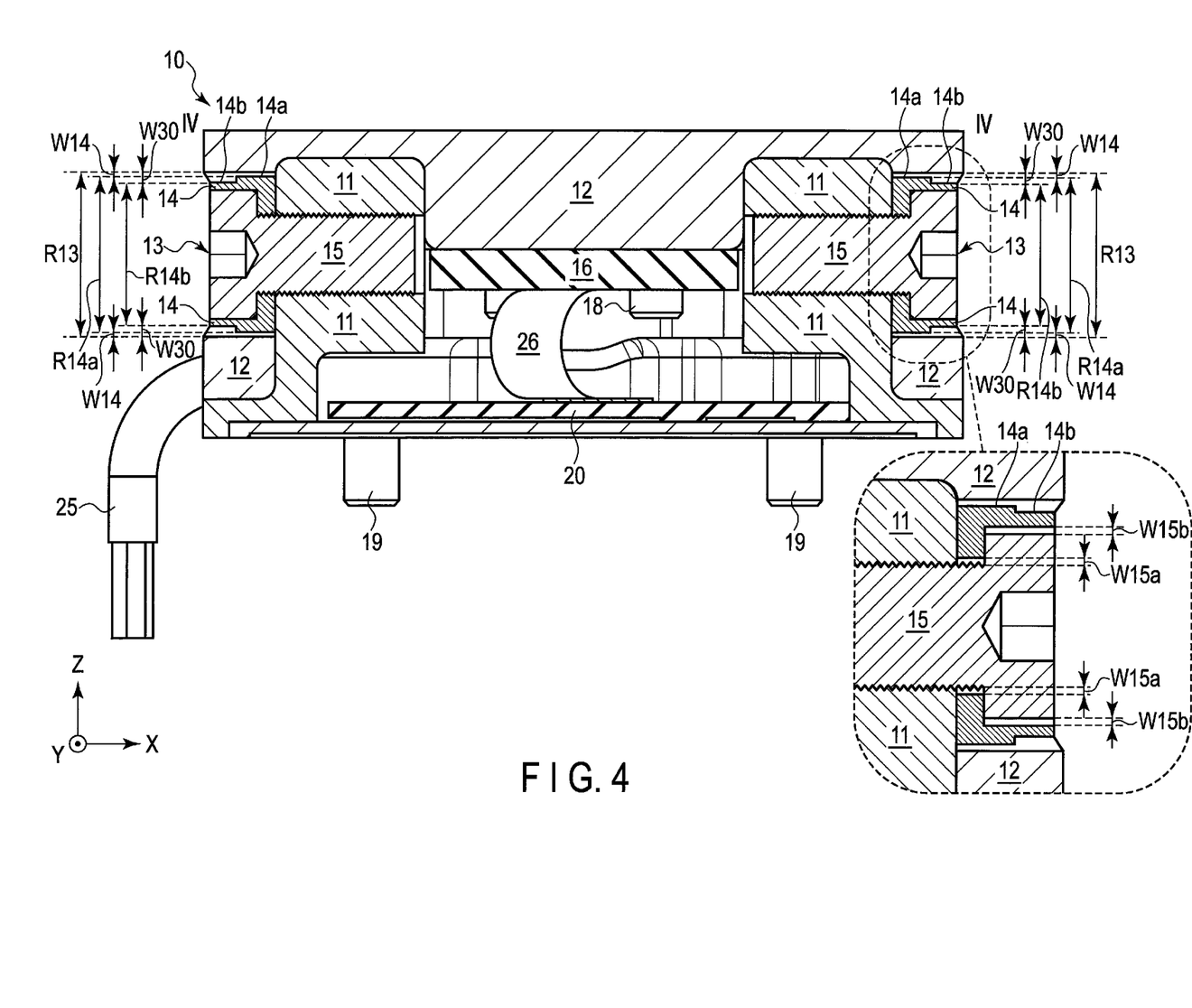
FIG. 4 is a cross-sectional view showing the force sensor along line IV-IV of FIG. 3.

The planar configuration and cross-sectional configuration of the force sensor according to the first embodiment will be described below in detail by using FIG. 3 and FIG. 4. FIG. 3 is a plan view showing the force sensor 10. FIG. 4 is a cross-sectional view showing the force sensor 10 along line IV-IV of FIG. 3.

The aforementioned strain sensors (not shown) are stuck on predetermined parts on the surface of the strain body 16, and measure the displacement of the respective positions of the strain body 16 to thereby detect force and torque in the six-axis directions. It should be noted that the configuration and arrangement of the strain sensor is not particularly limited, and can be modified. Further, between the strain body 16 and circuit board 20, a flexible printed circuit (FPC) configured to electrically connect the strain sensors provided on the strain body 16 and circuit board 20 to each other is provided. The FPC 26 is provided with an insulating flexible film and predetermined electrical circuit wired on the film, and is configured to be freely flexible according to the movement of the movable body 12.

The stopper 14 includes the aforementioned first side surface 14a and second side surface 14b. The first side surface 14a is positioned on the inner side of the second side surface 14b in the movable body 12, and has a first outer diameter R14a smaller than the inner diameter R13 of the opening 13 of the movable body 12. The second side surface 14b has a second outer diameter R14b smaller than the first outer diameter R14a. Accordingly, a distance W14 between the first side surface 14a and inner surface of the opening 13 is configured to be smaller than a distance W30 between the second side surface 14b and inner surface of the opening 13 (W14<W30). It should be noted that a gap corresponding to the distance W30 is also provided between the side surfaces of the movable body 12 and main body 11, and the movable body 12 is made movable with respect to the main body 11. The distance W30 is, for example, about several millimeters.

Here, the distance (clearance) W14 between the first side surface 14a and inner surface of the opening 13 is, for example, about 20 μm to 40 μm, and hence is very small. Furthermore, in order to prevent the strain body 16 from being damaged when the movable body 12 is moved, it is necessary to manage this distance (clearance) W14 with an extremely high degree of accuracy.

Moreover, as the part in FIG. 4 surrounded by a broken line is shown in an enlarging manner, actually, a predetermined gap of a distance W15a is provided between the inner surface of the stopper 14 parallel to the first side surface 14a and screw part of the fixing bolt 15. Further, a predetermined gap of a distance W15b is also provided between the inner surface of the stopper 14 parallel to the first and second side surfaces 14a and 14b and side of the head of the fixing bolt 15. The above-mentioned distances W15a and W15b are respectively, for example, about 0.2 mm. It should be noted that in the description to be given hereafter, illustrations of these gaps are omitted.

In this embodiment, in the state where a shim serving as a jig for adjustment is inserted between the second side surface 14b and inner surface of the opening 13, the stopper 14 is fixed to the main body 11 by means of the fixing bolt 15. The shim includes an insertion part having a thickness substantially identical to the distance W30. The stopper 14 can be moved by a distance corresponding to the distance W15a or W15b of each of the aforementioned gaps, and hence carrying out adjustment by using such a shim makes it possible to manage the distance (clearance) W14 between the inner surface of the opening 13 of the movable body 12 and first side surface 14a of the stopper 14 with a high degree of accuracy, secure a predetermined range of movement of the movable body 12 relative to the main body 11, and improve the sensitivity of the force sensor 10. Details of the above will be described later.

[Detecting Operation]

Figure 5:
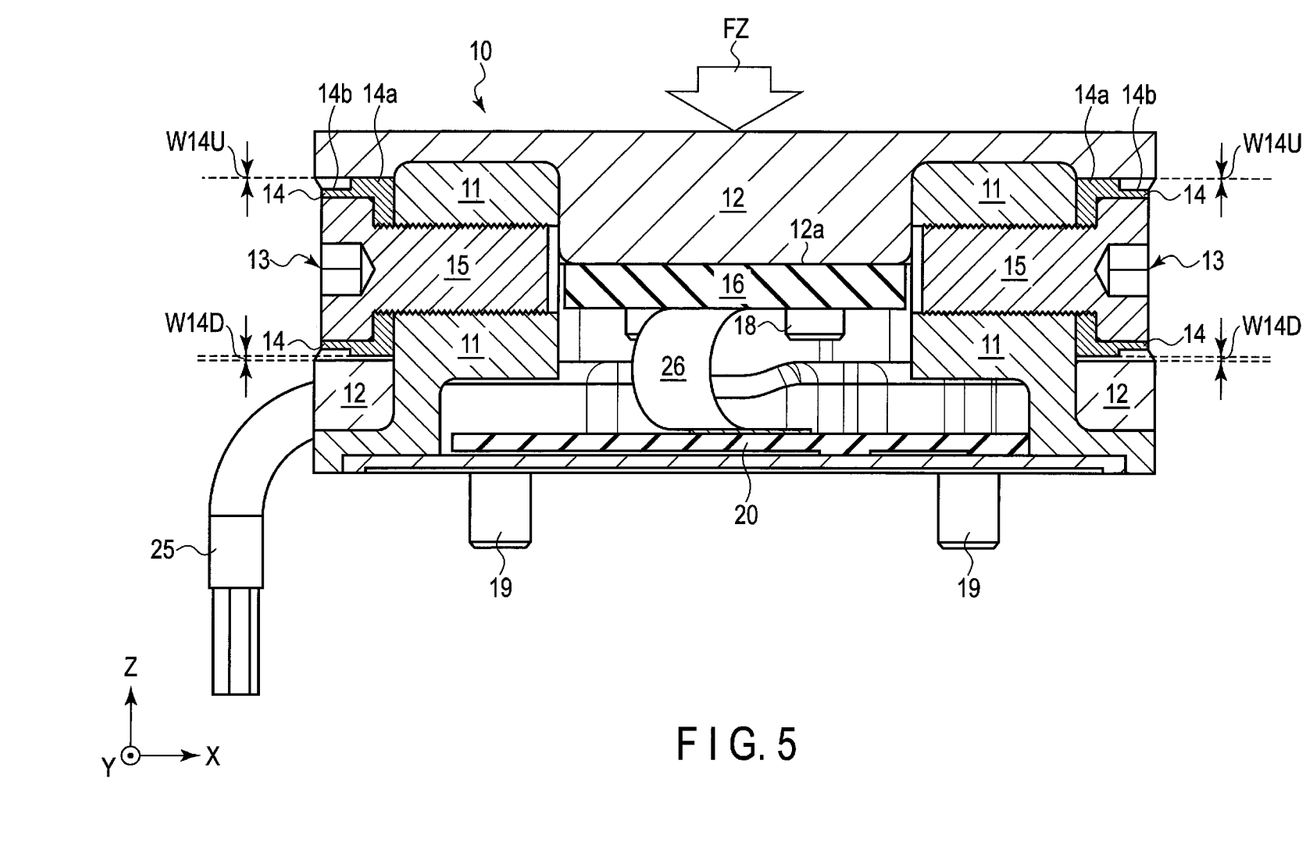
FIG. 5 is a cross-sectional view for explaining an external force detecting operation in the Z-axis direction.

A detecting operation of the force sensor 10 having the above-mentioned configuration will be described below by using FIG. 5. FIG. 5 is a cross-sectional view for explaining an external force detecting operation in the Z-axis direction. Here, a case where the external force (load) FZ applied to approximately a central part of the movable body 12 in the Z-axis direction is to be detected is taken as an example.

As shown in FIG. 5, upon application of the external force FZ to approximately the central part of the movable body 12 in the Z-axis direction, the movable body 12 is downwardly moved by the external force FZ in the Z-axis direction. The main body 11 fixed and is not moved even by the external force FZ, and hence the movable body 12 is downwardly moved until the upper inner surface of the opening 13 comes into contact with the first side surface 14a on the upper side of the stopper 14. Due to this movement, the upper distance W14U becomes substantially 0, and the distance W14D on the lower side increases to about twice the distance in the initial state before the movement.

Concomitantly with the movement of the movable body 12, the strain body 16 is deformed. The deformation of the strain body 16 is limited by the stopper 14 to a predetermined range. Accordingly, the strain body 16 is protected from destruction due to excessive external force. The deformation of the strain body 16 is detected by each of the strain sensors and is converted into a detection signal to be used as an electrical signal. The detection signal is transmitted to the outside by the wiring 25 through the FPC 26 and circuit board 20, whereby the external force FZ can be detected.

Thereafter, when the application of the external force FZ to the movable body 12 is removed, the strain body 16 is restored to the original shape by elastic deformation.

It should be noted that here although the external force detecting operation in the Z-axis direction has been taken as an example, the other external force detecting operations in the X-axis direction and Y-axis direction are carried out in the same manner. Further, torque detecting operations in the X-, Y-, and Z-axis directions are substantially identical to the above-mentioned external force detecting operation, and hence detailed descriptions of the operations are omitted.

[Adjustment of Clearance W14]

Next, adjustment of the clearance will be described below by using FIG. 6 and FIG. 7.

Figure 6:
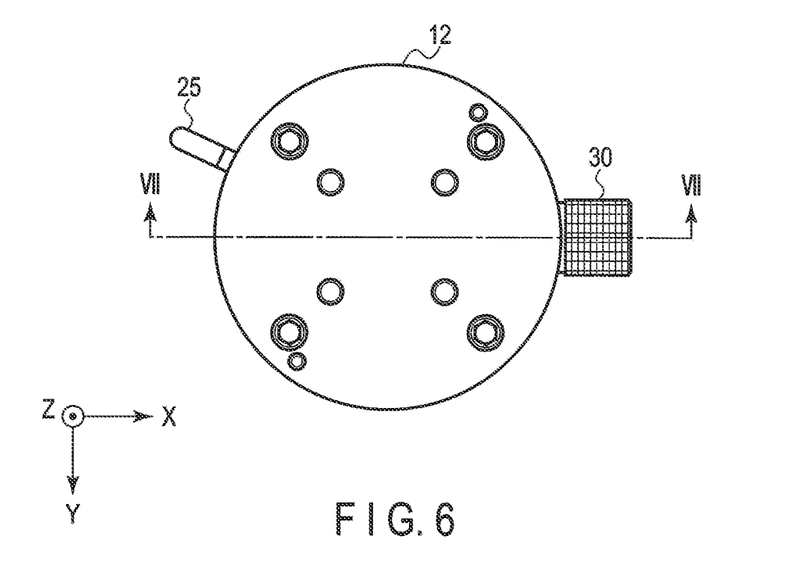
FIG. 6 is a plan view showing the force sensor to which a jig is attached.
Figure 7:
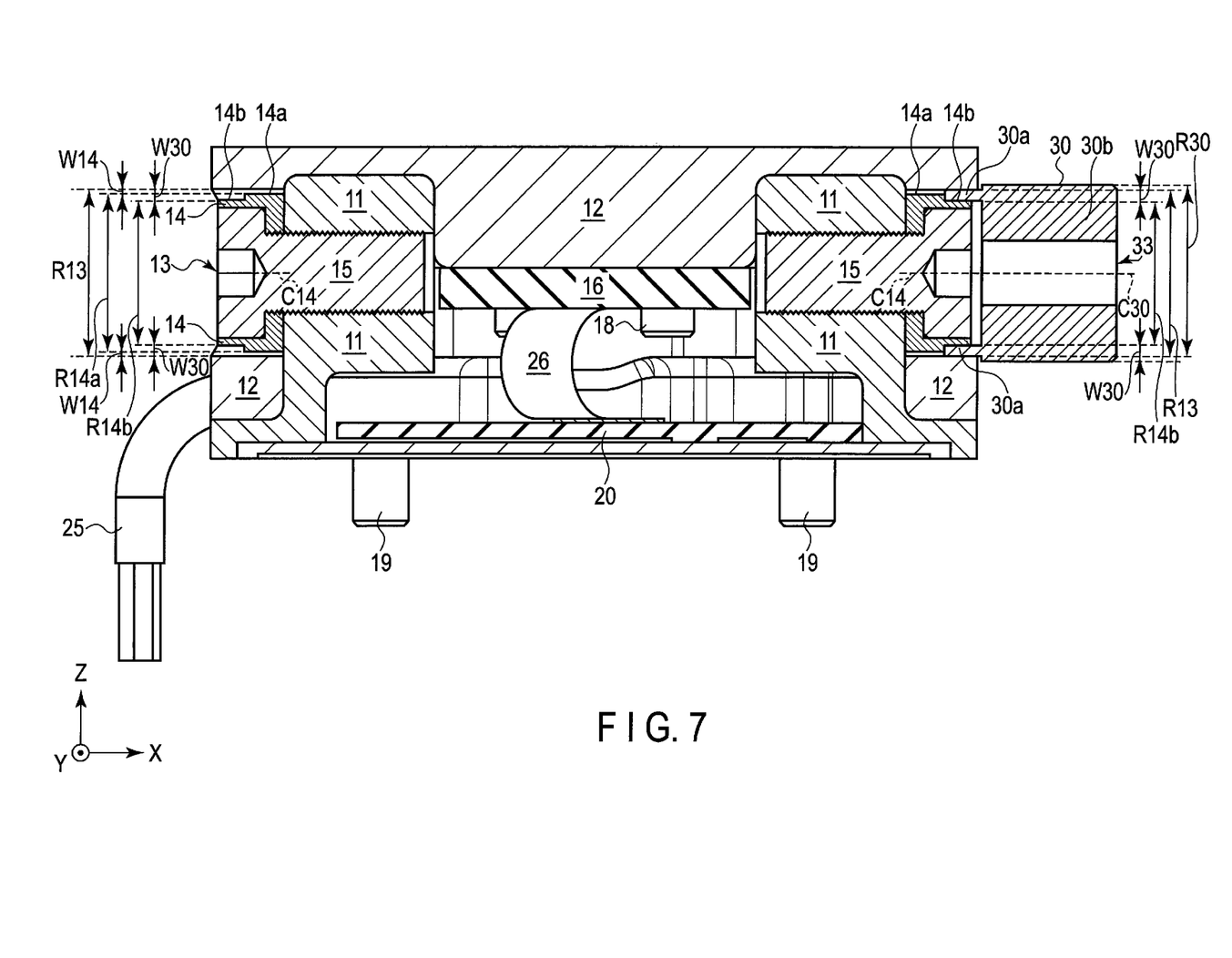
FIG. 7 is a cross-sectional view showing the force sensor along line VII-VII of FIG. 6.

As shown in FIG. 6 and FIG. 7, adjustment of the clearance is carried out by fitting a shim 30 into the opening 13. Although FIG. 6 and FIG. 7 show a case where the shim 30 is fitted into one of the openings 13, it is desirable that the adjustment be made in the state where shims 30 are fitted into all the four openings 13. In this case, it is possible to further improve the accuracy of adjustment, and shorten the time for the adjustment work.

As shown in FIG. 7, the shim 30 includes a cylindrical insertion part 30a, knob part 30b, and opening 33.

The knob part 30b has an outer diameter R30 greater than the inner diameter R13 of the opening 13.

The opening 33 penetrates the knob part 30a and is formed in such a manner as to allow a hexagonal wrench not shown to be inserted through the opening 33 into a hexagon socket provided in the head of the attaching bolt 15.

The insertion part 30a has an outer diameter R13 approximately equal to the inner diameter of the opening 13 of the movable body 12, and the thickness of the insertion part 30a is set to a thickness substantially identical to the distance W30 between the second side surface 14b of the stopper 14 and inner surface of the opening 13.

In the state where the attaching bolt 15 is loosened, the insertion part 30a of the shim 30 is inserted between the second face 14b of the stopper 14 and inner surface of the opening 13 as shown in FIG. 7. The outer diameter of the insertion part 30a is substantially identical to the inner diameter R13 of the opening 13, and inner diameter of the insertion part 30a is substantially identical to the second outer diameter R14b of the second side surface 14b of the stopper 14. Accordingly, in the state where the insertion part 30a of the shim 30 is inserted into the opening 13, the central axis C30 of the shim 30 and central axis C14 of the stopper 14 are made coincident with each other thereby forming concentric circles. That is, in this state, the stopper 14 is movable by the distance W15a or W15b of each of the aforementioned gaps, and hence the distance W14 between the first side surface 14a of the stopper 14 and inner surface of the opening 13 is accurately set.

In this state, by inserting the hexagonal wrench not shown into the opening 33 of the shim 30 to tighten the attaching bolt 15, the stopper 14 is fixed to the main body 11.

By inserting the insertion part 30a having a thickness corresponding to the distance W30 between the second side surface 14b of the stopper 14 and opening 13 in this manner, it is possible to accurately manage the clearance which is the distance W14 between the first side surface 14a of the stopper 14 and inner surface of the opening 13.

[Function and Advantage]

According to the first embodiment, the stopper 14 includes the first side surface with which the inner surface of the opening 13 of the movable body 12 comes into contact, and second side surface 14b having an outer diameter smaller than the first side surface and, at the time of adjustment of the stopper 14, the insertion part 30a of the shim 30 having a thickness corresponding to the distance W30 between the second side surface 14b and inner surface of the opening 13 is inserted between the second side surface 14b of the stopper 14 and inner surface of the opening 13. Accordingly, the central axis C30 of the shim 30 and central axis C14 of the stopper 14 coincide with each other, whereby the stopper 14 is moved by a distance corresponding to the distance W15a or W15b of each of the aforementioned gaps, and it is possible to accurately set the distance W14 between the first side surface 14a of the stopper and inner surface of the opening 13.

Figure 8:
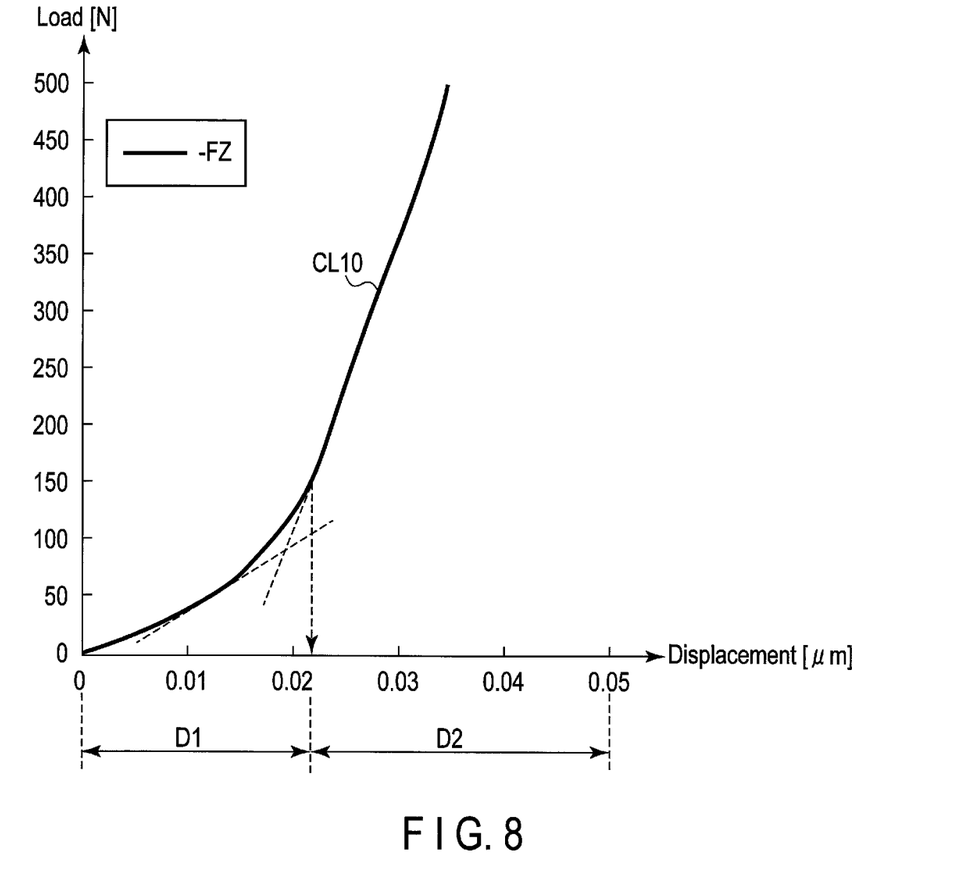
FIG. 8 is a view showing a relationship between the displacement of a strain body and load of the case where load is applied in the Z-direction.

For example, when a load FZ is applied to the force sensor 10 according to this embodiment, a relationship between the displacement [μm] of the strain body 16 and detected load [N] is shown as FIG. 8. As shown in FIG. 8, the characteristic line CL10 changes in the gradient (rising angle) thereof in the vicinity of the position 0.022 μm (inflection point) of the displacement in the Z direction. This indicates that in the region (D1) from the point at which the displacement is 0 to the inflection point, the strain body 16 is deformed without functioning of the stopper 14, and in the region (D2) from the inflection point forward, the first side surface 14a of the stopper 14 is in contact with the inner surface of the opening 13, and hence the stopper 14 is functioning. In the region (D2) after the inflection point, the gradient of the characteristic line CL10 increases, and the strain body 16 is hardly deformed, whereby it is evident that the distance W14 which is the clearance could have accurately been set.

Moreover, it is sufficient, in the state where the attaching bolt 15 is loosened, if only the shim 30 is attached, and then the attaching bolt 15 is tightened by way of the opening 33 of the shim 30, and hence it is possible to facilitate the adjustment work while reducing the error of the distance W14 which is the clearance to the extent possible.

Furthermore, the first side surface 14a and second side surface 14b of the stopper 14 can be formed by continuous machining in, for example, one and the same process. Accordingly, dimensional management and inspection of the first side surface 14a and second side surface 14b can easily be carried out.

Further, regarding the movable body 12, it is sufficient if, even in the manufacture and processing thereof, only the dimension of the diameter R13 of the opening 13 is managed, and hence dimensional management and inspection thereof can easily be carried out.

Furthermore, the shim 30 can be formed by continuous machining of the outer face and inner surface of the insertion part 30a in, for example, one and the same process. Accordingly, it is possible to facilitate dimensional management and inspection of the shim 30, and improve the degree of concentricity.

Moreover, the stopper 14 has a very simple shape, and has a protective function with respect to all the six-axis directions. Accordingly, it becomes possible to provide a force sensor 10 having high sensitivity and advantageous to reduction in manufacturing cost.

Second Embodiment (One Example Having Tapered Structure)

A force sensor 10A according to a second embodiment will be described below by using FIG. 9 and FIG. 10. The second embodiment relates to an example in which each of the stopper 14 and shim 30 has a tapered structure.

[Structure]

Figure 9:
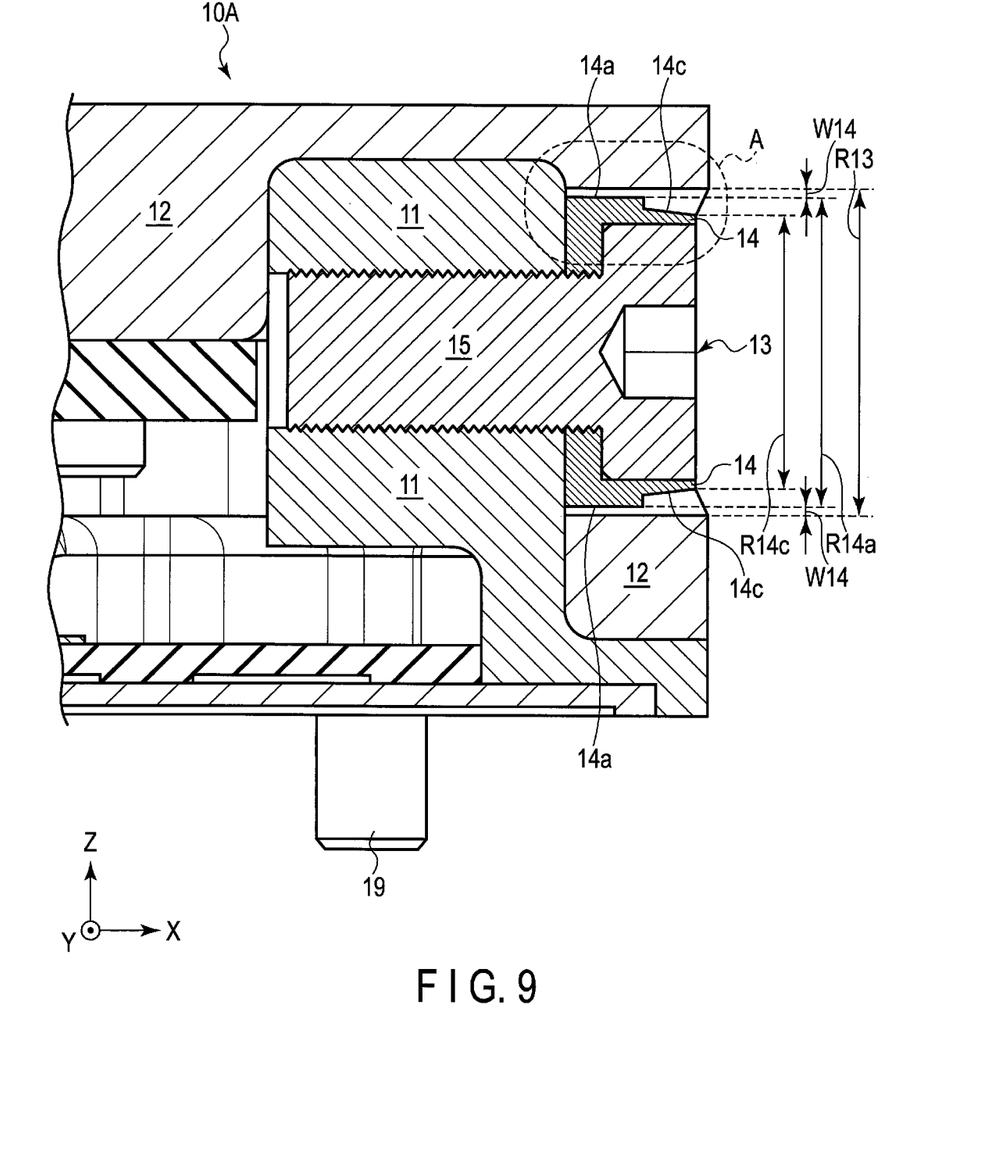
FIG. 9 is a cross-sectional view showing a force sensor according to a second embodiment and showing only the essential part thereof.

FIG. 9 is a cross-sectional view showing a force sensor 10A according to a second embodiment. FIG. 10 is a cross-sectional view showing a part of the force sensor 10A in the vicinity of A of FIG. 9, in the state where a jig is used.

As shown in FIG. 9, in the second embodiment, the stopper 14 has a tapered structure configured in such a manner that the second outer diameter R14c gradually decreases as being spaced away from the first side surface 14a. As shown in FIG. 10, the angle θ14 which the second side surface 14c of the stopper 14 forms with the horizontal surface is an acute angle.

Figure 10:
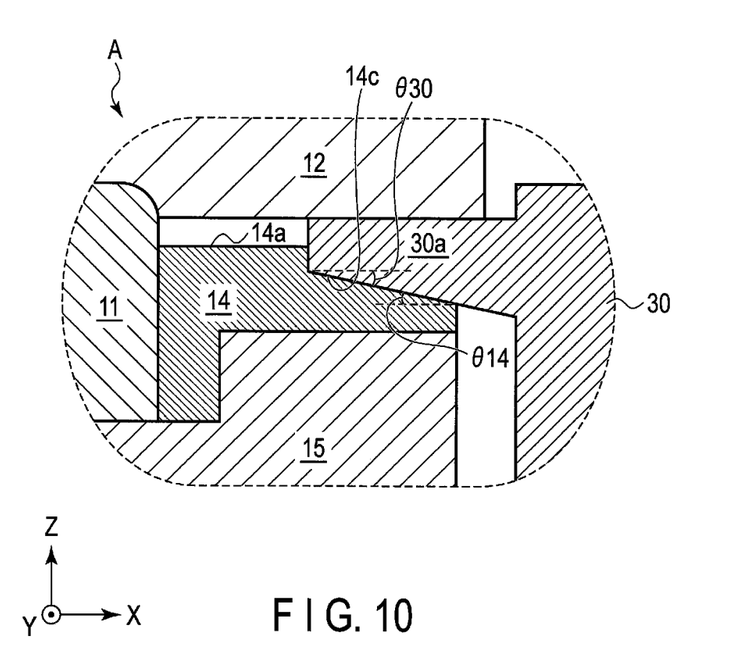
FIG. 10 is a cross-sectional view showing a part indicated by A of FIG. 9 in an enlarging manner.

Furthermore, as shown in FIG. 10, in order to be coincident with the tapered structure of the stopper 14, the inner surface of the insertion part 30a of the shim 30 has a tapered structure configured in such a manner that the diameter of the inner surface of the insertion part 30a gradually decreases as being spaced away from the first side surface 14a. The angle θ30 which the inner surface of the insertion part 30a of the shim 30 forms with the horizontal surface is an acute angle.

Other structures are substantially identical to the first embodiment described above, and hence detailed descriptions of the structures are omitted. Further, the detecting operation is also substantially identical to the first embodiment described above, and hence detailed description of the operation is omitted.

[Function and Advantage]

According to the structure and operation of the force sensor 10A according to the second embodiment, at least advantages identical to the first embodiment can be obtained.

Furthermore, in the force sensor 10A according to the second embodiment, the second side surface 14c of the stopper 14 and insertion part 30a of the shim 30 include tapered structures. More specifically, as shown in FIG. 9, the second side surface 14c of the stopper 14 and inner surface of the insertion part 30a are configured in such a manner that the second outer diameter R14c and inner diameter of the inner surface gradually decrease as being spaced away from the first side surface 14a.

As described above, the second side surface 14c of the stopper 14 and insertion part 30a of the shim 30 include the tapered structures, whereby when positioning of the stopper 14 is to be carried out, it is possible to easily insert the insertion part 30a of the shim 30 into the opening 13.

Moreover, the second side surface 14c of the stopper 14 and insertion part 30a of the shim 30 include the tapered structures, whereby it is possible to make the central axes of the stopper 14 and shim 30 securely coincident with each other. Accordingly, it is possible to manage the distance W14 between the first side surface 14a and inner surface of the opening 13 with a higher degree of accuracy than the first embodiment.

Modification Example

The present invention is not limited to the disclosure of the first and second embodiments, and it is of course possible to contrive various modifications as the need arises.

For example, in this embodiment, although the stopper 14 is fixed to the main body 11 by means of the attaching bolts 15, the configuration is not limited to this. More specifically, in the first embodiment, although the part of the movable body 12 in which the opening 13 is provided is positioned outside the part of the main body 11 into which the attaching bolt 15 is screwed, the configuration in which a part in which the opening 13 is provided is provided in the main body 11, part into which the attaching bolt 15 is screwed is provided in the movable body 12, the part in which the opening 13 is provided and provided in the main body 11 is arranged outside the part into which the attaching bolt 15 is screwed and provided in the movable body 12, and the stopper 14 is arranged inside the opening 13 provided in the main body 11 may also be employed.

Further, the use of the shim 30 is not limited to the case of inspection of the force sensor 10 or 10A, and use of the shim 30 may also be made in the case of, for example, maintenance or the like to be carried out after an actual operation of the force sensor 10 or 10A for a certain length of time.

The invention is not limited to the foregoing embodiment but in the implementation stage various changes and modifications of its components may be made without departing from the scope of the present invention. Also, the components disclosed in the embodiment may be assembled in any combination for embodying the present invention. For example, some of the components may be omitted from all the components disclosed in the embodiment. Further, components in different embodiments may be appropriately combined.

The force sensor according to the embodiment of the present invention can be applied to, for example, a robot arm or the like.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A force sensor comprising:
a cylindrical main body;
a cylindrical movable body capable of moving with respect to the main body;
a strain body fixed to the main body and the movable body, and capable of deformation in accordance with the movement of the movable body;
strain sensors provided on the strain body;
at least three circular openings provided in the circumferential surface of the movable body at equal intervals;
stoppers being arranged inside the openings, each of the stoppers including a first side surface and a second side surface, the first side surface having a first outer diameter smaller than an inner diameter of the opening and capable of contacting the inner surface of the opening, and the second side surface being positioned outer side of the first side surface, the second side surface having a second outer diameter smaller than the first outer diameter, and configured in such a manner that a jig for adjustment can be inserted between the second side surface and an inner surface of the opening;
fixing members configured to fix the stoppers to the main body; and
a gap having a predetermined distance between an inner surface of each stopper parallel to the first side surface or the second side surface and the fixing member,
wherein each stopper is configured in such a manner that when the jig is inserted between the inner surface of the opening and the second side surface, the stopper can be moved by a distance corresponding to the distance of the gap.

2. The force sensor of claim 1, wherein
the second outer diameter of the second side surface gradually decreases as being spaced away from the first side surface.

3. The force sensor of claim 2, wherein
the jig includes an insertion part which can be inserted between the inner surface of the opening and the second side surface, and
an inner diameter of an inner surface of the insertion part gradually decreases as being spaced away from the first side surface.

4. A force sensor comprising:
a cylindrical main body;
a cylindrical movable body capable of moving with respect to the main body;
a strain body fixed to the main body and the movable body, and capable of deformation in accordance with the movement of the movable body;
strain sensors provided on the strain body;
at least three circular openings provided in the circumferential surface of the main body at equal intervals;
stoppers being arranged inside the openings, each of the stoppers including a first side surface and a second side surface, the first side surface having a first outer diameter smaller than an inner diameter of the opening and capable of contacting the inner surface of the opening, and the second side surface being positioned outer side of the first side surface, including a second outer diameter smaller than the first outer diameter, and configured in such a manner that a jig for adjustment can be inserted between the second side surface and an inner surface of the opening;
fixing members configured to fix the stoppers to the movable body; and
a gap having a predetermined distance between an inner surface of each stopper parallel to the first side surface or the second side surface and the fixing member, wherein
each stopper is configured in such a manner that when the jig is inserted between the inner surface of the opening and the second side surface, the stopper can be moved by a distance corresponding to the distance of the gap.

5. The force sensor of claim 4, wherein
the second outer diameter of the second side surface gradually decreases as being spaced away from the first side surface.

6. The force sensor of claim 5, wherein
the jig includes an insertion part which can be inserted between the inner surface of the opening and the second side surface, and
an inner diameter of an inner surface of the insertion part decreases gradually as being spaced away from the first side surface.

* * * * *